Oct. 27, 1942.  S. C. FARMER  2,300,212
PEACH STONER
Filed Dec. 8, 1941  4 Sheets-Sheet 1
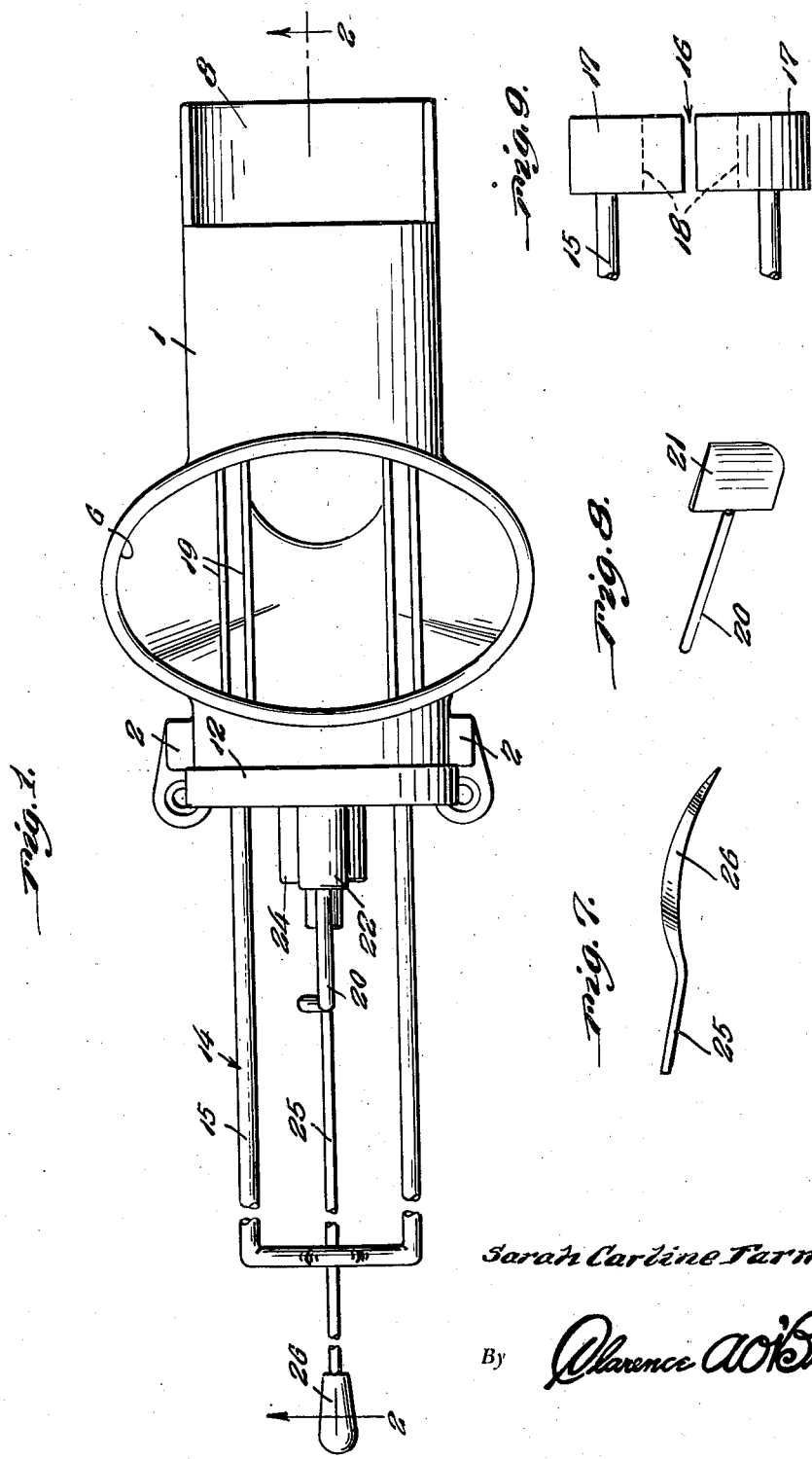
Inventor
Sarah Carline Farmer
By Clarence A. O'Brien
Attorney Oct. 27, 1942.  S. C. FARMER  2,300,212
PEACH STONER
Filed Dec. 8, 1941  4 Sheets-Sheet 2
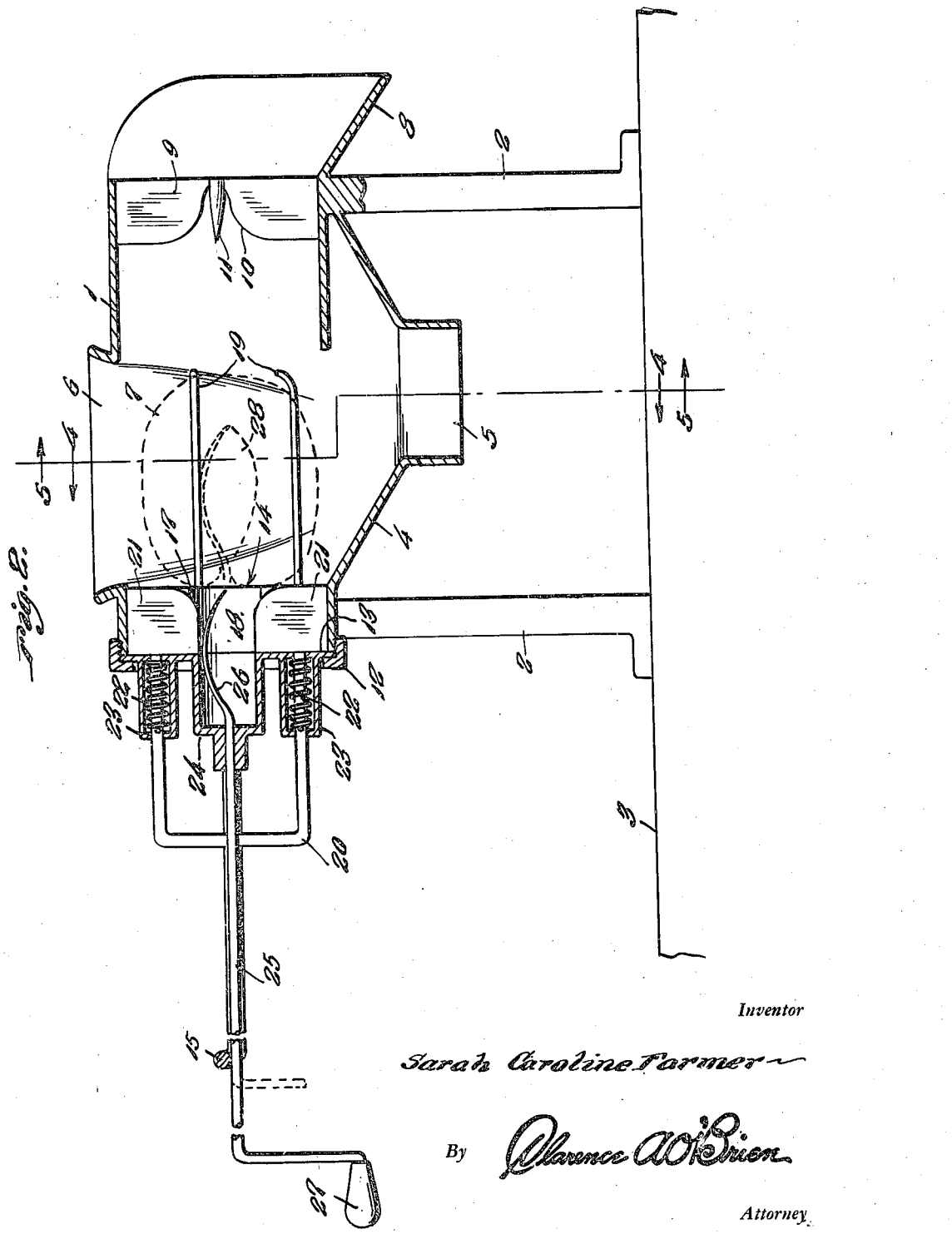
Inventor
Sarah Caroline Farmer
By Clarence A. O'Brien
Attorney

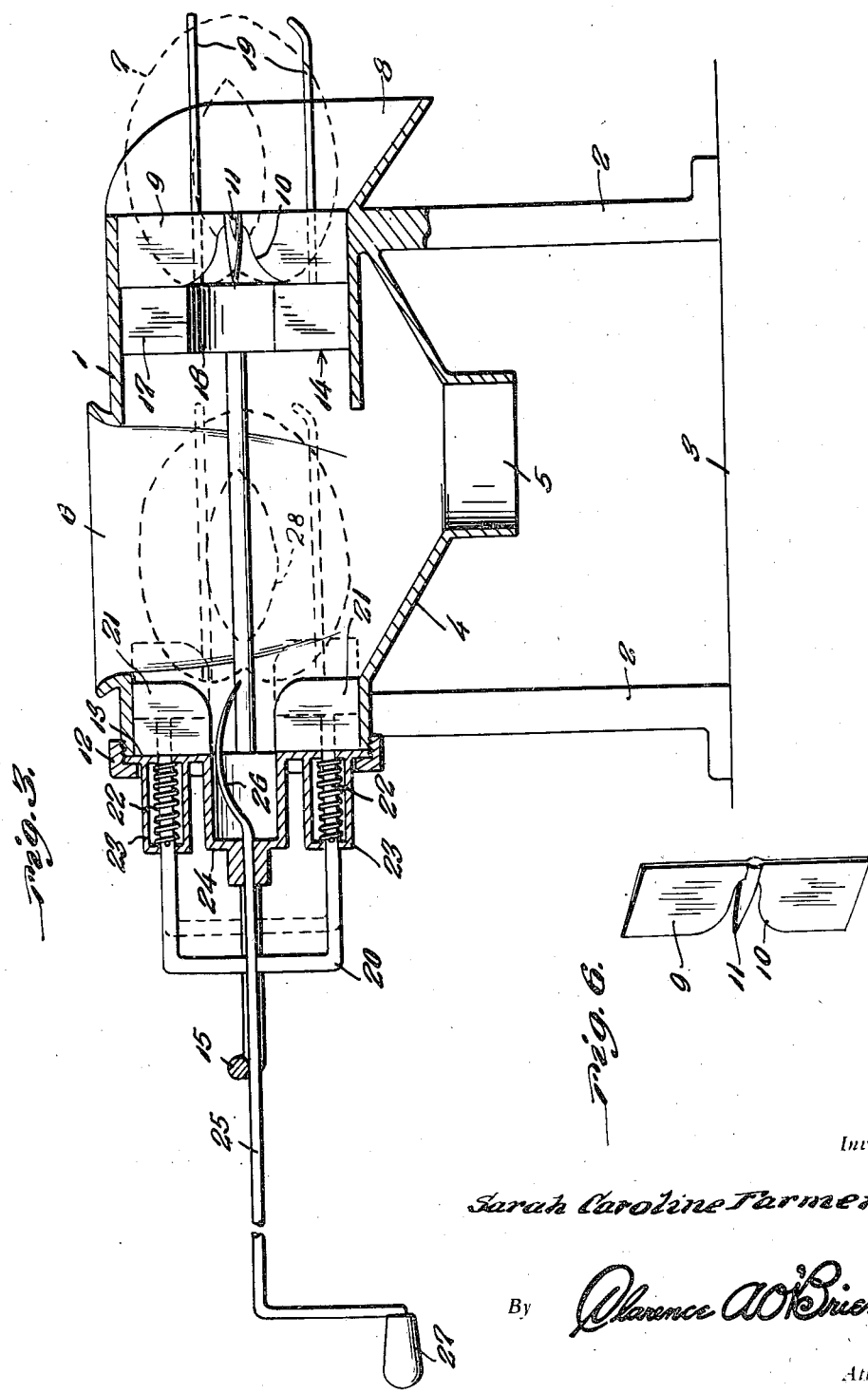

Oct. 27, 1942.  S. C. FARMER  2,300,212
PEACH STONER
Filed Dec. 8, 1941  4 Sheets-Sheet 4
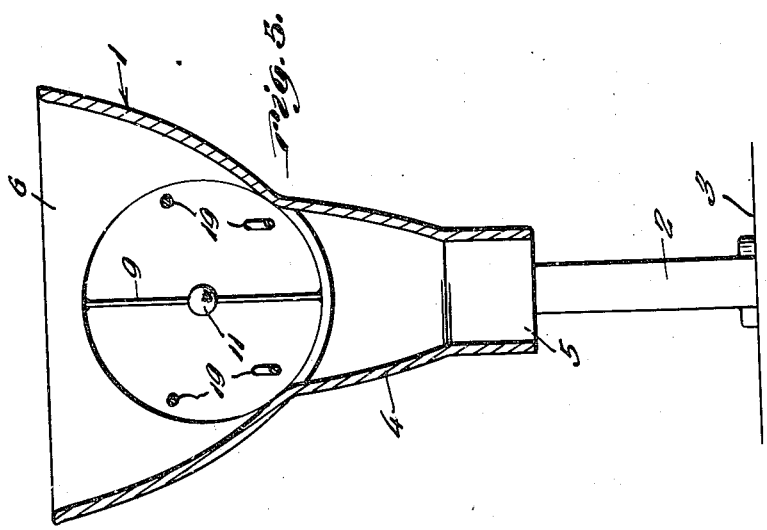
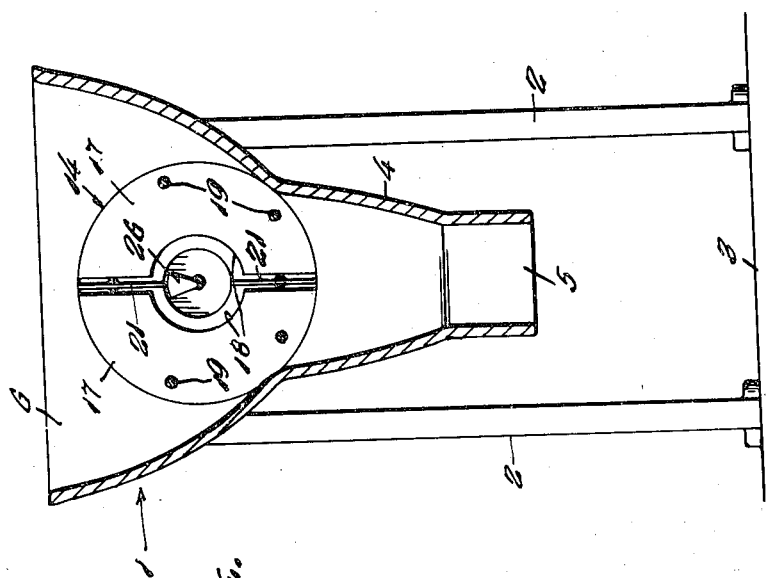
Inventor
Sarah Caroline Farmer
By Clarence A. O'Brien
Attorney Patented Oct. 27, 1942

2,300,212

UNITED STATES PATENT OFFICE 2,300,212

PEACH STONER

Sarah Caroline Farmer, Eugene, Oreg., assignor of one-half to Lydia May Clark, Modesto, Calif.

Application December 8, 1941, Serial No. 422,148

2 Claims. (Cl. 146—28)

The present invention relates to new and useful improvements in peach stoners and has for one of its important objects to provide, in a manner as hereinafter set forth, a machine of this character comprising unique means for receiving and holding the fruit while the stone is cut or severed from the meat of said fruit.

Another very important object of the invention is to provide a machine of the aforementioned character which is adapted to halve the fruit in addition to removing the stone therefrom.

Other objects of the invention are to provide a peach stoner of the character described which will be comparatively simple in construction, strong, durable, highly efficient and reliable in use, compact, sanitary, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a peach stoner constructed in accordance with the present invention.

Figure 2 is a view in vertical longitudinal section through the machine, taken substantially on the line 2—2 of Figure 1.

Figure 3 is a vertical longitudinal sectional view, showing the carriage in forward or projected position.

Figures 4 and 5 are cross-sectional views, taken substantially on the line 4—4 and 5—5 of Figure 2, looking in opposite directions, as indicated by the arrows.

Figure 6 is a detail view in perspective of the stationary front blade.

Figure 7 is a detail view in perspective of the stoning knife.

Figure 8 is a detail view in perspective of one of the movable rear blades.

Figure 9 is a top plan view of the carriage.

Referring now to the drawings in detail, it will be seen that the embodiment of the invention which has been illustrated comprises a horizontal cylindrical housing 1 of suitable metal. The housing 1 is provided with legs 2 which rest on a bench or other suitable support 3. The legs 2 may be secured to the support 3 in any desired manner.

The lower portion of the housing 1 is formed to provide a depending hopper 4 for the reception of the stones as they are removed from the fruit, said hopper being provided with a discharge opening 5. The upper portion of the housing 1 is formed to provide an opening 6 for the insertion of the fruit, as at 7, Fig. 2. The forward end of the housing 1 is open and projecting therefrom is a chute or the like 8. Suitable receptacles may be placed beneath the hopper 4 and the chute 8 for receiving the stones and the halved fruit as they leave the machine.

Mounted vertically in the forward end portion of the housing 1 is a stationary knife 9. The intermediate portion of the cutting edge of the knife 9 is recessed, as at 10. Projecting from the knife 9 in the recess 10 is a pin 11, the purpose of which will be presently set forth.

An internally flanged ring 12 is threaded on the other end portion of the housing 1 and secures thereon a plate 13. A carriage, designated generally by reference numeral 14, is operable longitudinally in the cylindrical housing 1.

The carriage 14 includes a substantially U-shaped handle 15 the legs of which extend slidably into the housing 1 through the plate 13. Mounted on the handle 15 and operable in the housing 1 is a piston 16. The piston 16 comprises a pair of spaced, opposed, segmental sections 17 which are fixed on the free end portions of the legs of the handle 15. The opposed faces of the piston sections 17 have formed therein complemental recesses 18. Projecting forwardly from the sections 17 of the piston 16 are resilient fingers 19 for receiving and gripping the fruit 7.

Also extending slidably through the plate 13 into the rear end portion of the cylindrical housing 1 is a comparatively short, substantially U-shaped handle 20. Blades 21 are fixed on the end portions of the handle 20 for cutting the rear end portion of the fruit 7. Coil springs 22 retract the blades 21. Tubular casings 23 on the plate 13 enclose the coil springs 22. The legs of the substantially U-shaped handle 20 pass longitudinally through the casings 23. The blades 21, when in retracted position, are located between the spaced piston sections 17.

Projecting rearwardly from the plate 13 and communicating with the housing 1 is a centrally located cylindrical chamber 24. Rotatably and slidably mounted in the closed rear end of the chamber 24 is a shaft 25. An arcuate stoning knife 26 is provided on the forward end of the shaft 25, both edges of said knife being sharp. An operating crank 27 is provided on the rear end of the shaft 25. The cylindrical chamber 24 and the piston recesses 18 receive the knife 26 when said knife is in retracted or inoperative position.

The movable blades 21 are of substantially the shape shown to advantage in Figure 8 of the drawings.

It is thought that the operation of the machine will be readily apparent from a consideration of the foregoing. Briefly, the fruit to be stoned and halved is placed in the cylindrical housing 1 through the opening 6 and engaged in the resilient fingers 19 which hold said fruit in position in longitudinal alignment with the knife 26. The shaft 25 is then moved forwardly for inserting the knife 26 in the fruit from one end thereof, said knife being forced into position relative to the stone of the fruit, as at 28, to the curvature of which said knife substantially conforms. The crank handle 27 is now turned for revolving the knife 26 around the stone 28, thus cutting said stone from the meat of the fruit. The handle 20 is moved forwardly against the tension of the coil springs 22 for causing the blades 21 to cut the rear end portion of the fruit longitudinally. The blades 21 and 9 are in alignment. The carriage 14 with the fruit 7 thereon is then moved forwardly in the housing 1, as seen in Figure 3 of the drawings. In this manner the fruit is forced past the knife 9 which completes the halving of said fruit and the pin 11 engages and ejects the stone 28. The stone drops into the hopper 4 and the halves of the fruit are directed into a suitable receptacle (not shown) by the chute 8. The carriage 14 is then retracted and the machine is ready for the next operation. The stone is ejected from the fruit through the complemental recesses 18 in the piston sections 17.

It is believed that the many advantages of a peach stoning machine constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A machine of the character described comprising a horizontal, substantially cylindrical housing open at one end, a stationary blade mounted in the open end portion of said housing, a piston in operative alignment with said blade operable in the housing, means for supporting a fruit on said piston, blades slidable in the housing for cutting one end portion of the fruit, the piston including spaced half-sections for the reception of the slidable blades therebetween, and means for actuating the piston in the housing for forcing the fruit past the stationary blade.

2. A machine of the character described comprising a horizontal, substantially cylindrical housing having an opening for the reception of fruit, said housing being open at one end, a stationary blade in the open end portion of the housing, a substantially U-shaped handle extending slidably into the housing through the other end thereof, a piston in operative alignment with said blade operable in the housing and comprising opposed half-sections mounted on the end portions of the handle, resilient fingers projecting from the piston for supporting the fruit thereon, a second substantially U-shaped handle extending slidably into the housing through said other end thereof, slidable blades mounted on the ends of the second-named handle for cutting one end portion of the fruit, the piston sections being spaced from each other for the reception of the slidable blades therebetween, means connected to the second-named handle for retracting the slidable blades, the first-named handle constituting means for forcing the fruit forwardly in the housing past the first-named blade.

SARAH CAROLINE FARMER.